Feb. 24, 1970  E. HENRY-BIABAUD  3,497,660
FLUID CONTROL SYSTEM
Filed March 20, 1967  2 Sheets-Sheet 1

Edmond Henry-Biabaud
INVENTOR.

BY Karl G. Ross
Attorney

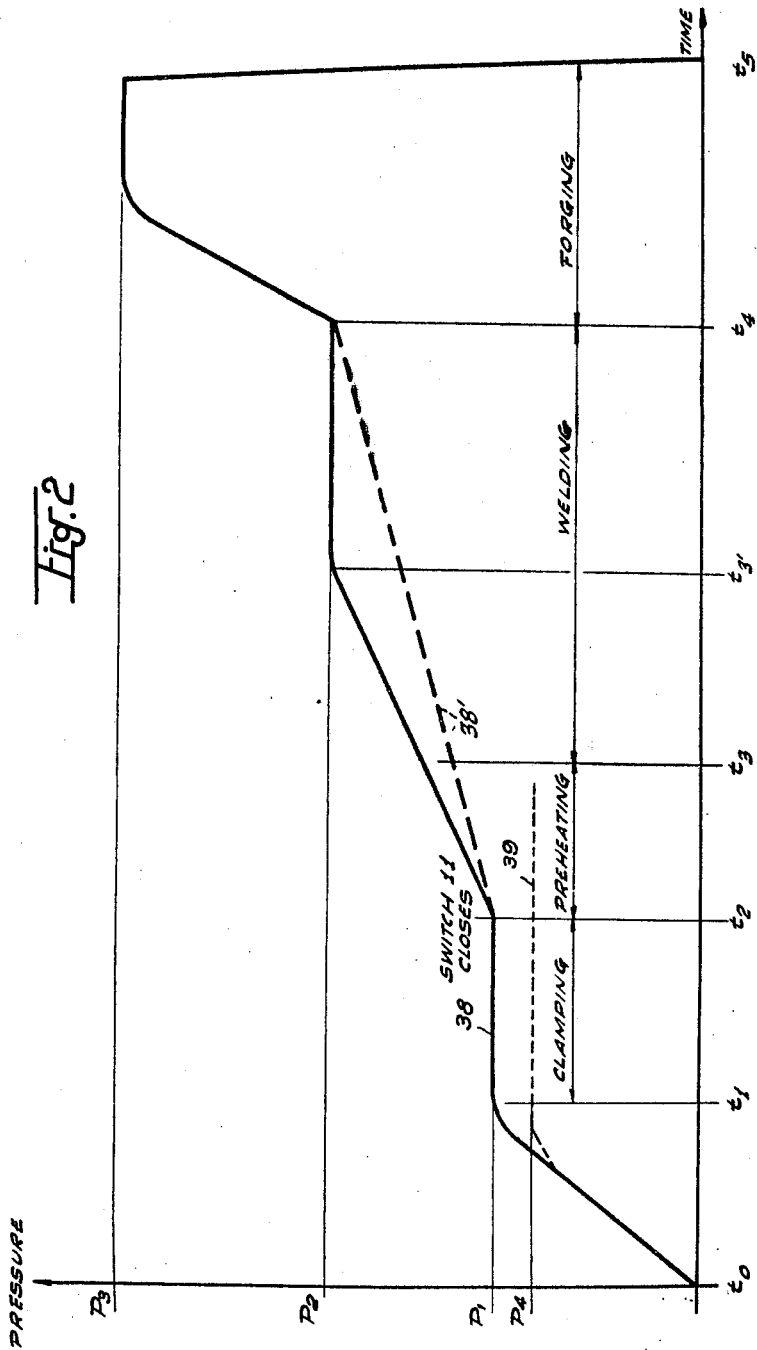

United States Patent Office 3,497,660
Patented Feb. 24, 1970

3,497,660
FLUID CONTROL SYSTEM
Edmond Henry-Biabaud, Paris, France, assignor to Societe Anonyme Andre Citroen, Paris, France
Filed Mar. 20, 1967, Ser. No. 624,370
Claims priority, application France, Mar. 26, 1966, 3,263
Int. Cl. B23k 9/28
U.S. Cl. 219—89       10 Claims

ABSTRACT OF THE DISCLOSURE

A fluid-control system designed to apply progressively increasing pressures to a load, such as a welding apparatus, includes a first, a second and a third stage respectively represented by a low-pressure feed circuit, an intermediate-pressure feed circuit and a high-pressure feed circuit. A load circuit successively receives pneumatic fluid from a high-pressure supply by way of these three feed circuits which each include a control valve inserted between a pressure reducer and a flow regulator. An operating circuit for the second-stage control valve is branched off the low-pressure feed circuit ahead of its flow regulator to enable the establishment of the intermediate pressure, with coincidental energization of the welding electrodes, only upon a sufficient pressure buildup in the first stage. An auxiliary feed circuit, effective in the disconnected state of the three main feed circuits, is manually controllable to establish a reduced load pressure lower than that of the first stage.

---

Figure 1:
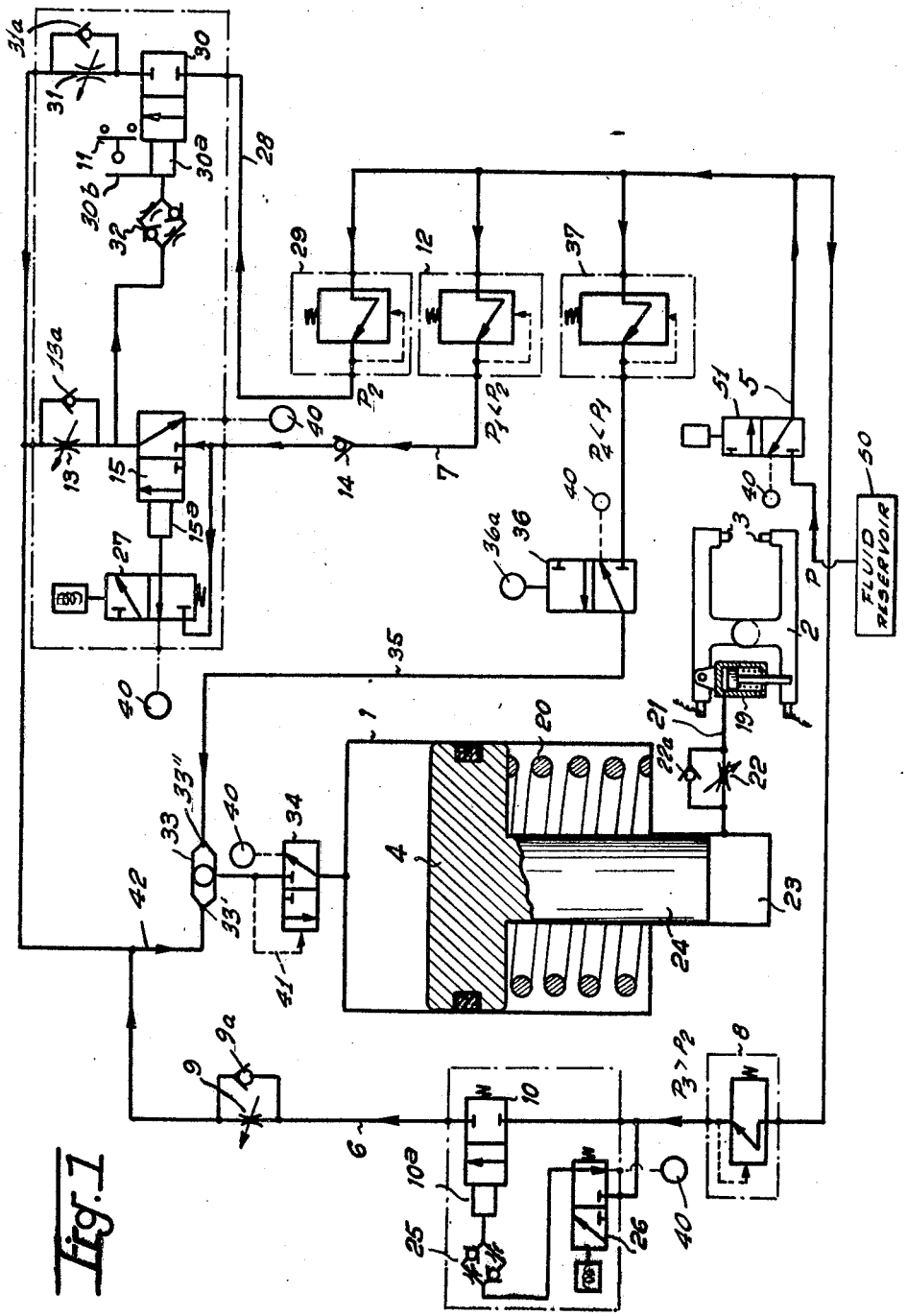

The present invention relates to a sequential fluid-control system as used, in particular, for pneumatic welding.

Sequential control systems are known wherein a fluid source is connected to a circuit to be controlled, through the intermediary of two interconnected circuits which are arranged in parallel and in each of which is interposed a valve and a pressure reducer, the two reducers being regulated at different pressures in a manner to provide a high-pressure control circuit and a low-pressure circuit; the opening of the two valves is staggered, the valve of the low-pressure circuit opening first.

This system, described particularly in French Patent No. 1,431,916, is especially suitable for ensuring the operation of welding tongs or analogous apparatus, the two circuits of the apparatus corresponding respectively on the one hand to the converging of the electrodes, thereafter to applying pressure to them, and on the other hand to welding and to forging.

The present invention has for its object an improvement to this control apparatus.

The present invention provides a sequential fluid-control system with a load circuit successively connectable to a fluid source through three feed circuits each containing a control valve and a pressure reducer, the three reducers being set to different values, and means for sequentially opening the valve of the low-pressure circuit, the valve of the intermediate-pressure circuit and the valve of the high-pressure circuit.

The system according to the present invention is particularly suitable for ensuring the control of a welding apparatus when the thicknesses of the workpieces to be welded are relatively large. In this application, the electrodes are supplied with current at the moment when the intermediate or mean pressure is being established, so that the workpieces are welded under an increasing pressure; thereafter, forging follows under a pressure higher than that with which they have been welded.

In an advantageous embodiment of the invention, the valve of the intermediate-pressure circuit is controlled by the pressure existing in the controlling circuit in such a manner as to open only when the magnitude of this pressure attains the low-pressure level. This valve can, for example, be pneumatically controlled, its control cylinder being connected to the high-pressure fluid supply via a pneumatic timer whose restricted fluid passage is connected to a discharge port of the first-stage control valve so as to receive low-pressure operating fluid simultaneously with the load. In a preferred embodiment, the pneumatic operating circuit for the second-stage control valve is branched off the low-pressure feed circuit at a location ahead of a flow regulator of the latter circuit. When the system is used for the control of a welding mechanism whose energization is controlled by the means serving to establish the intermediate pressure, such energization is thus prevented if the electrodes do not exert with the necessary pressure upon the workpieces to be welded, since in that case the pressure at the branching point will not be sufficient to open the second-stage control valve.

The valve of the high-pressure circuit can be pneumatically controlled, the control cylinder of this valve being connected through the intermediary of another pneumatic timer to an auxiliary valve which opens at the same time as the valve of the low-pressure circuit.

An embodiment of a pneumatic control system in accordance with the present invetnion will now be described, by way of example, with reference to the accompanying diagrammatic drawing in which:

FIG. 1 is a diagram of the overall system; and
FIG. 2 shows the variation of the control-fluid pressure as a function of time.

FIG. 1 shows a high-pressure feed circuit 6 and a low-pressure feed circuit 7 capable of supplying the cylinder 1 of a fluid-operated jack. This jack is single-acting, the return of its piston 4 being effected by a spring 20. The jack controls, through the intermediary of an auxiliary hydraulic jack 19, welding tongs 2 having electrodes 3. The hydraulic jack 19 is connected through a pipe 21, in which is interposed an adjustable throttle or flow regulator 22, to a cylinder 23 in which is movably mounted a piston 24 rigid with the piston 4. Pneumatic fluid at a pressure P is delivered to the system from a reservoir 50 by way of a supply circuit 5 including a control valve 51.

The high-pressure circuit 6 is connected to the main supply circuit 5 through the intermediary of a pressure reducer 8, of a pneumatically controlled valve 10 and an adjustable throttle 9. The control cylinder 10a of the valve 10 is connected to the pressure reducer 8 by way of a pneumatic timer 25, essentially a pair of parallel, oppositely oriented check valves in series with respective throttles, and an electrically operated three-way valve 26.

Likewise, the low-pressure circuit 7 receives fluid from supply circuit 5 via a pressure reducer 12 which is set at a pressure $P_1$ lower than the regulated pressure $P_3$ of the reducer 8, a check valve 14, a pneumatically controlled three-way valve 15, and an adjustable throttle 13. The control cylinder 15a of the valve 15 is connected to the pressure reducer 12 by way of an electrically operated three-way valve 27.

An intermediate pressure feed circuit 28 is connected to supply circuit 5, in parallel with the circuits 6 and 7, comprises by way of a pressure reducer 29 set at a pressure $P_2$ between the pressures $P_1$ and $P_3$, a pneumatically controlled valve 30, and an adjustable throttle 31. The control cylinder 30a of the valve 30 is connected by a pneumatic timer 32 (similar to timer 25) to the circuit 7, at a location downstream of the valve 15. A switch 11, which controls the starting of the welding cycle, is operated by the valve 30, as it reaches its open position, via a slide 30b Furthermore, a double valve 33 and a three-way distributor 34 are interposed between the cylinder 1 and the circuits 6, 7 and 28 which terminate at its left-hand inlet port 33′. An auxiliary circuit 35, whose function will be apparent later, is similarly connected to the distributor 34 through the right-hand inlet port 33″ of the double valve 33; the latter is arranged in a manner enabling the distributor 34 to receive fluid either through one of the feed circuits 6, 7, 28 or through the auxiliary circuit 35 while preventing the passage of fluid from the circuit 35 to one of the feed circuits 6, 7, 28 or vice versa. The distributor 34 normally enables the cylinder 1 to be vented to the atmosphere, as indicated at 40, but is controlled by the upstream pressure, via a connection indicated diagrammatically at 41, in such a way as to open automatically when any one of the circuits 6, 7, 28 or 35 is placed under pressure.

The circuit 35 can be connected to the main supply circuit 5 by the intermediary of a manual control valve 36 and a pressure reducer 37 set at a value $P_4$ which is lower than $P_1$. Owing to the interposition of valve 33, circuit 35 will be ineffectual (irrespectively of the position of its control valve 36) as long as pressure higher than its own output pressure $P_4$ is present at the junction 42 of the outputs from the three flow regulators 9, 13 and 31, i.e. as long as any of the control valves 10, 15 and 30 is open.

The several throttles or flow regulators 9, 13, 22 and 31 are shunted by respective check valves 9a, 13a, 22a and 31a.

The apparatus just described operates in the following manner.

When it is desired to commence a welding operation, the electrically operated valves 26 and 27 are opened. The valve 15 thereupon immediately opens and the low-pressure circuit 7 is connected to the valve 34 which also opens; the piston 4 is displaced and the electrodes 3 approach the members to be welded, with a speed which depends on the adjustment of the regulator 22.

From the time $t_0$ of converging of the electrodes, the pressure in the hydraulic jack 1 increases progressively in order to attain the level $P_1$, as the curve 38 shows in FIG. 2 which represents the variation of this pressure as a function of time. The gradient of the force depends on the adjustment of the throttle 13.

After a certain clamping interval $t_1$–$t_2$, whose duration depends on the adjustment of the timer 32, the valve 30 opens so that the jack 1 is connected to the intermediate-pressure circuit 28, with concurrent closure of switch 11 which starts the welding operation.

The second-stage pressure $P_2$, overriding the pressure $P_1$ of first-stage feed circuit 6 in the left-hand inlet port 33′ of valve 33, is established progressively at a rate depending on the adjustment of the throttle 31. During this time the preheating of the workpieces to be welded takes place; welding start at time $t_3$.

Upon the opening of valve 26, the timer 25 controls the opening of valve 10. e.g. a fixed time period $t_3$–$t_4$ after the establishment of the pressure $P_2$, as indicated in full lines in FIG. 2; alternatively, the timing can be such that the opening of the valve 10 occurs just at the moment $t_4$ when the pressure $P_2$ is established as indicated by the dotted line 38′.

The high pressure $P_3$, overriding the pressure $P_2$ in the valve port 33′, is established progressively at a rate determined by the adjustment of the throttle 9, which ensures a forging of the welded members.

Once the welding has terminated, at time $P_5$, the supply circuits of the electrically operated valves 26 and 27 are opened, thereby venting the circuit downstream of the valve 15 and causing the closure of the valves 10 and 30; the circuit upstream of the valve 34 being connected to atmosphere, this valve now vents the cylinder 1 so that the piston 4 rises under the action of spring 20 and the welding electrodes 3 move away from the welded workpieces. The apparatus is thus ready for a new welding cycle.

The valve 36, shown provided with a handle 36a for manual control, allows the forcing of the welding electrodes against each other with a reduced pressure $P_4$ which enables a manual resetting of the electrodes and which depends on the adjustment of a pressure regulator 37; the corresponding curve 39 is shown in FIG. 2.

The pneumatic timing arrangement 25 can be omitted if electronic means are provided for energizing the electrically-operated valve 26 a fixed time after the energization of the electrically operated valve 27.

I claim:

1. In a fluid-control system for delivering pneumatic fluid at progressively increasing pressures to a load, in combination:
a supply of high-pressure pneumatic fluid;
a load circuit actuatable by said pneumatic fluid;
a plurality of feed circuits connected in parallel between said supply and said load circuit, said feed circuits including pressure-reducing means for establishing different fluid pressures in the outputs of said feed circuits including a lower first-stage pressure in the output of a first feed circuit and a higher second-stage pressure in the output of a second feed circuit;
a normally closed first control valve in said first feed circuit;
a normally closed second control valve in said second feed circuit;
operating means for opening said first control valve at the beginning of a work cycle;
and a pneumatic operating circuit for opening said second control valve at a later stage of said cycle, said operating circuit being connected to said first feed circuit at a location downstream of said first control valve and including pneumatic timer means for delaying the opening of said second control valve.

2. The combination defined in caim 1 wherein said first feed circuit further inclules a flow regulator downstream of said first control valve, said operating circuit being branched off said first feed circuit at a location between said first control valve and said flow regulator.

3. The combination defined in claim 2 wherein said second feed circuit includes another flow regulator, said load circuit being connected in parallel to the outputs of both said flow regulators.

4. The combination defined in claim 3 wherein said feed circuits include a third feed circuit with a third-stage output pressure higher than said third feed circuit being provided with a third control valve and with a third flow regulator downstream of said third control valve, said load circuit being connected in parallel to the outputs of all said flow regulators, said third control valve being provided with delayed operating means for opening same subsequently to the opening of said second control valve.

5. The combination defined in claim 4, further comprising a double valve inserted between said load circuit and the outputs of said three flow regulators, said double valve having a first inlet port connected to said outputs and a second inlet port separated from said first inlet port, said feed circuits including an auxiliary feed circuit with an output pressure lower than said first-stage pressure connected to said second inlet port.

6. The combination defined in claim 4 wherein said delayed operating means includes a pneumatic timer.

7. In a fluid-control system for delivering pneumatic fluid at progressively increasing pressures to a welding apparatus including a pair of relatively movable electrodes, in combination:
a supply of high-pressure pneumatic fluid;
a load circuit including pneumatic actuating means for moving said electrodes toward each other;
a plurality of feed circuits connected in parallel between said supply and said load circuit, said feed circuits including pressure-reducing means for establishing different fluid pressures in the outputs of said feed circuits including a relatively low first-stage pressure in the output of a first feed circuit, an intermediate second-stage pressure in the output of a second feed circuit and a relatively high third-stage pressure in the output of a third feed circuit;

a normally closed first control valve in said first feed circuit;

a normally closed second control valve in said second feed circuit;

a normally closed third control valve in said third feed circuit;

operating means for sequentially opening said first, second and third control valves, said operating means including a pneumatic operating circuit for said second control valve connected to said first feed circuit at a location downstream of said first control valve and pneumatic timer means in said operating circuit for delaying the opening of said second control valve;

and energizing means for said electrodes operative upon the establishment of said intermediate pressure.

8. The combination defined in claim 7 wherein said energizing means includes switch means operable by said second control valve upon the opening thereof.

9. The combination defined in claim 7 wherein each of said feed circuits includes a respective flow regulator downstream of the control valve thereof, said load circuit being connected in parallel to the outputs of all said flow regulators.

10. The combination confined in claim 9, further comprising an auxiliary feed circuit with an output pressure lower than said first-stage pressure, and valve means for connecting said auxiliay feed circuit to said load circuit in the absence of pressure from said first, second and third feed circuit.

References Cited
UNITED STATES PATENTS

| | | | |
|---|---|---|---|
| 2,383,695 | 8/1945 | Thacker | 219—89 |
| 2,415,603 | 2/1947 | Muller et al. | 137—110 X |
| 2,458,758 | 1/1949 | Zulinski et al. | 219—86 |
| 2,999,482 | 9/1961 | Bower | 91—6 X |
| 3,038,449 | 6/1962 | Murphy et al. | 91—6 X |
| 3,129,320 | 4/1964 | Capaldo et al. | 219—89 |
| 3,294,105 | 12/1966 | Schaub | 137—118 X |
| 3,298,075 | 1/1967 | Shoe | 91—6 X |
| 3,303,316 | 2/1967 | Bogosian | 219—89 X |
| 3,357,359 | 12/1967 | Schaub | 137—110 X |

JOSEPH V. TRUHE, Primary Examiner

PETER W. GOWDEY, Assistant Examiner

U.S. Cl. X.R.

91—6